W. SONNBERG.
CAGE FOR BALL BEARINGS.
APPLICATION FILED FEB. 9, 1907.

918,785.

Patented Apr. 20, 1909.

WITNESSES:

INVENTOR:
Wilhelm Sonnberg,
By his Attorneys

UNITED STATES PATENT OFFICE.

WILHELM SONNBERG, OF BERLIN, GERMANY.

CAGE FOR BALL-BEARINGS.

No. 918,785.    Specification of Letters Patent.    Patented April 20, 1909.

Application filed February 9, 1907. Serial No. 356,633.

*To all whom it may concern:*

Be it known that I, WILHELM SONNBERG, a subject of the King of Prussia, residing at 43/44 Dorotheenstrasse, Berlin, in the Kingdom of Prussia, Germany, have invented certain new and useful Improvements in Cages for Ball-Bearings, of which the following is a full, clear, and exact description.

The present invention refers to the manufacture of a partitioned and undivided cage, in which the balls are held in pockets closed by bending over lugs or the like, and allow as far as possible free play in the rotary direction, but provide a firm bearing at the axes of rotation or near the same. This cage may consist of a casting of brass, bronze or the like in which one or both of the lugs, which form the wall or walls of the pockets by being bent over, are rigidly formed with the cage by casting or otherwise, or in any other suitable manner. The cage thus constructed has the advantage of the utmost simplicity and durability, more particularly as it is made in one piece and consequently there are no parts to be held together by special connecting pieces so that there can be no accidental loosening of the parts of the cage, thus altogether excluding any disturbances in the working of the bearing arising from such causes, while after the lugs have been bent over, the balls are held absolutely securely in their pockets.

Figure 1:
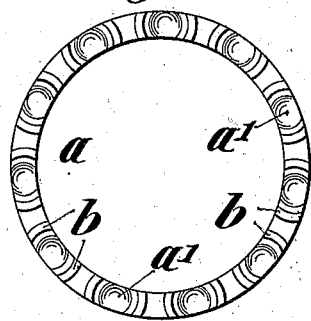
Figure 2:
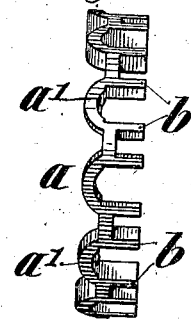
Figure 3:
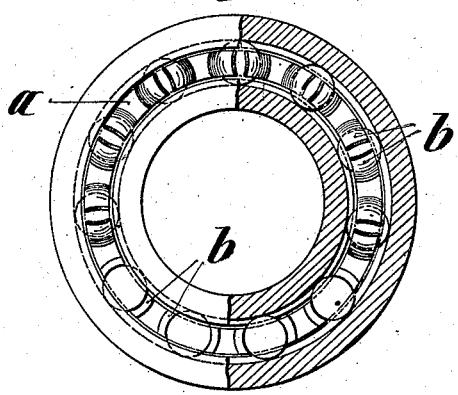
Figure 4:
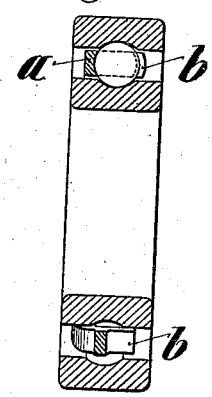

In the accompanying drawings, Figure 1 is an elevation of a ball cage constructed according to the present invention. Fig. 2 is an edge view thereof. Fig. 3 is an elevation partly in section of a bearing fitted with a cage constructed according to the present invention. Fig. 4 is a transverse section thereof.

Referring to the drawings, in which one form of construction of the cage according to the present invention is shown, which consists of a partitioned ring-like cast pressed or stamped part $a$, with lugs $b$ which are cast on or bent out from the ring itself, such lugs $b$ being provided on each side of each recess $a^1$ for the balls. After the balls have been inserted between the lugs $b$ which form together with the walls of the recesses $a^1$ pockets for the balls, the lugs are bent around inward or toward one another whereby a completed cage is obtained as may be seen in Figs. 3 and 4. The cage thus forms a single rigid undivided part in which each of the balls is held in a separate pocket, whose walls are formed by the recess $a^1$ and by the lugs $b$. Preferably, the balls are so held that they rest only on their axes of rotation or near the same but are free to rotate in either direction.

It must be expressly observed, that the lugs may be riveted or otherwise suitably attached to the partitioned rigid cast or pressed ring but the construction, in which the lugs are formed in one piece with the cage, is to be preferred, that is to say, in which they are cast together with the cage, and in which the material is so chosen that it permits a subsequent bending over of the lugs after the insertion of the ball.

What I claim as my invention, and desire to secure by patent is:

1. A cage for ball bearings comprising a ring-shaped member having a body portion lying on one side of the bearing, such body portion being formed with a series of recesses closed on such side and open upon the opposite side, and elongated lugs projecting laterally of the cage and substantially axially of the bearing to the opposite side thereof from such body portion, said lugs extending in pairs between each two adjacent balls, and adapted to be bent in opposite directions to embrace the balls.

2. A cage for ball bearings comprising a ring-shaped member having a body portion lying on one side of the bearing, such body portion being formed with a series of recesses closed on such side and open upon the opposite side, and elongated lugs projecting laterally of the cage and substantially axially of the bearing to the opposite side thereof from such body portion, said lugs extending in pairs between each two adjacent balls, and adapted to be bent in opposite directions to embrace the balls, said cage being formed of a single piece of metal.

3. A cage for ball bearings comprising a light ring-shaped body formed of one piece of cast metal having recesses which are closed at one side and open at the other side, said body having on each side of each recess an integral elongated lug or tongue, said lugs or tongues extending between adjacent balls and each of which lugs or tongues is adapted to be bent around a ball when in said recess.

In witness whereof, I have hereunto signed my name in the presence of two subscribing witnesses.

WILHELM SONNBERG.

Witnesses:
 WOLDEMAR HAUPT,
 HENRY HASPER.